United States Patent [19]
Couch et al.

[11] Patent Number: 6,135,268
[45] Date of Patent: Oct. 24, 2000

[54] METHOD AND APPARATUS FOR CONTROLLING CONVEYOR

[75] Inventors: Jimmie D. Couch, Burlington; Eric C. Crump, Florence, both of Ky.

[73] Assignees: Mazak Corporation, Florence, Ky.; Jorgensen Conveyors, Inc., Mequon, Wis.

[21] Appl. No.: 09/081,538

[22] Filed: May 19, 1998

Related U.S. Application Data

[60] Provisional application No. 60/047,047, May 19, 1997.

[51] Int. Cl.[7] .................................................. B65G 43/08
[52] U.S. Cl. ....................... 198/573; 198/502.1; 198/323
[58] Field of Search ............................... 198/464.4, 571, 198/572, 573, 577, 502.1, 502.4, 832

[56] References Cited

U.S. PATENT DOCUMENTS

| | | | |
|---|---|---|---|
| 4,264,905 | 4/1981 | Shapiro | 198/502.4 X |
| 4,809,576 | 3/1989 | Bakermans et al. | 198/502.1 X |
| 5,042,643 | 8/1991 | Akama | 198/572 X |
| 5,189,624 | 2/1993 | Barlow et al. | 364/474.11 |

FOREIGN PATENT DOCUMENTS

| | | | |
|---|---|---|---|
| 24 32 928 | 1/1975 | Germany | 198/323 |
| 39 12 187 | 10/1989 | Germany | 198/573 |
| 40 24 183 | 2/1991 | Germany | 198/323 |
| 4-277191 | 10/1992 | Japan | 198/323 |
| 5-124787 | 5/1993 | Japan | 198/323 |
| 6-144765 | 5/1994 | Japan | 198/323 |

*Primary Examiner*—James R. Bidwell
*Attorney, Agent, or Firm*—Quarles & Bardy, LLP

[57] ABSTRACT

A clearing method for use with a conveyor belt driven by a reversible motor for essentially automatically eliminating swarf or other obstructions along the belt including an clearing process including sensing motor load and comparing sensed load to a maximum load, when the sensed load exceeds the maximum, stopping the belt, reversing the belt, stopping the belt again and driving the belt forward, and repeating this process until the obstruction is eliminated or a predetermined number of clearing processes have been performed. Also an apparatus for implementing the method including an inverter.

9 Claims, 4 Drawing Sheets

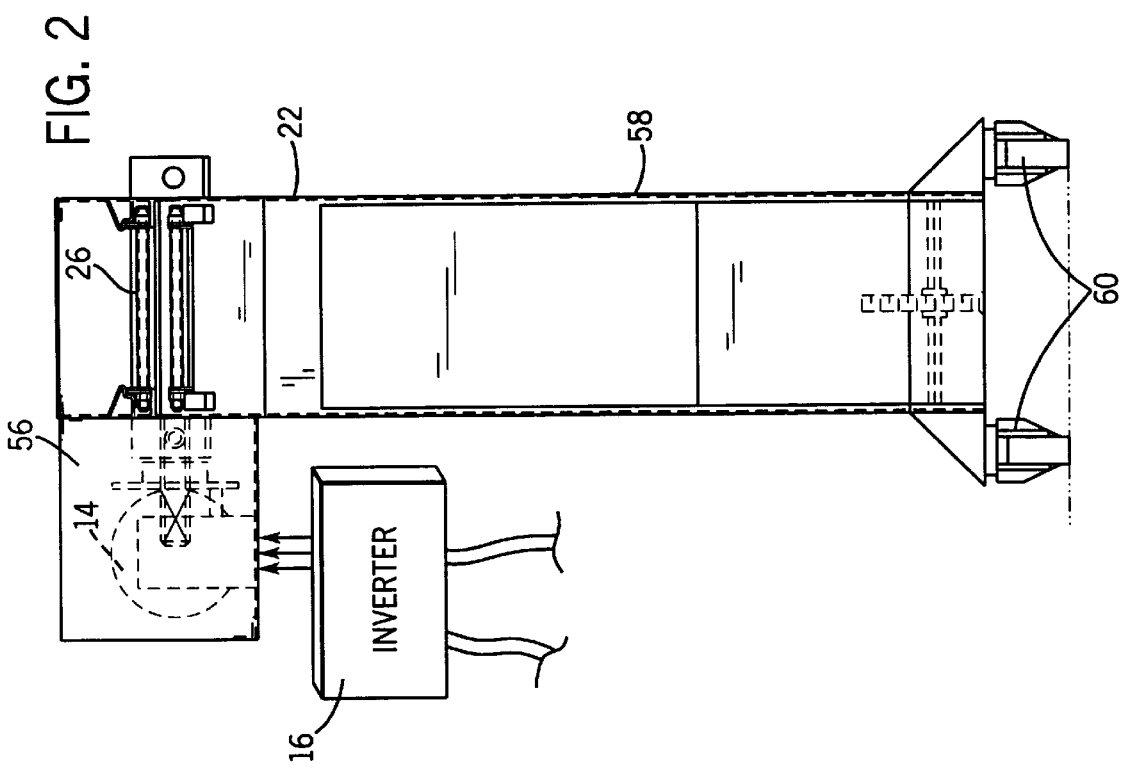
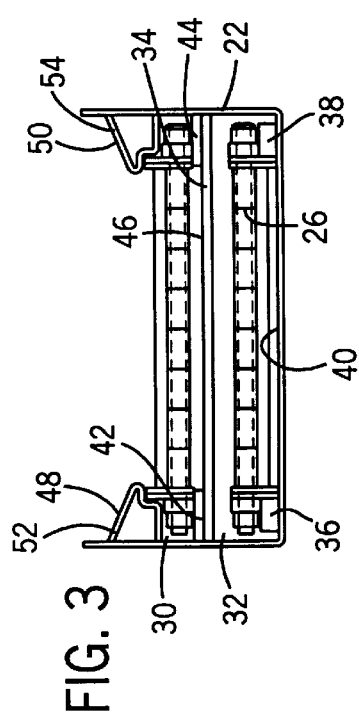
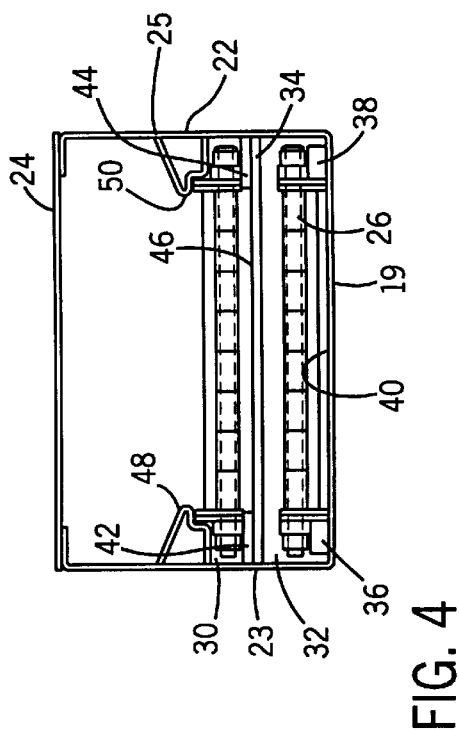

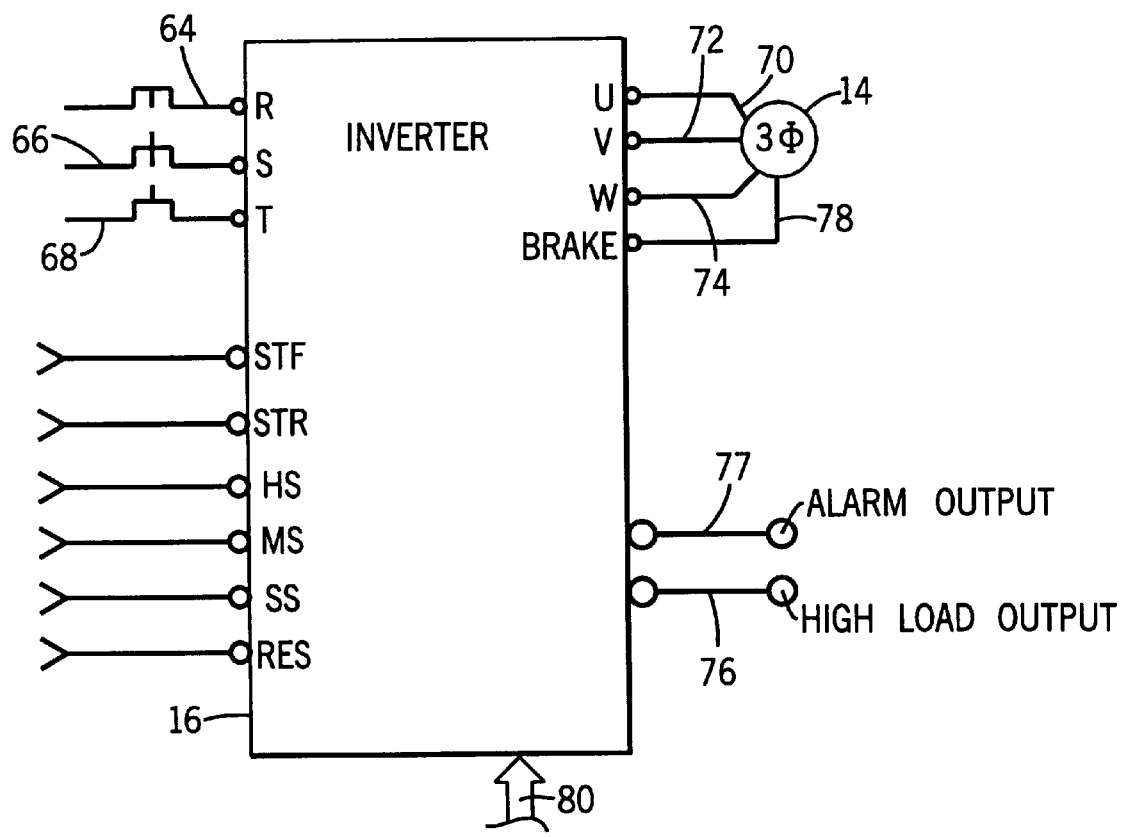

METHOD AND APPARATUS FOR CONTROLLING CONVEYOR

This application claims the benefit of provisional application No. 60/047,047, filed May 19, 1997.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to swarf collecting apparatus and methods and more specifically to a method of controlling a swarf collecting conveyor to clear swarf obstructions which cause excessive conveyor motor and drive component loading.

Many industries routinely employ lathes, drills, mills and other machinery having specially configured cutting bits to shape metal work pieces by removing metal "chips" therefrom. The chips which are removed come in many different shapes and sizes which are collectively referred to as swarf.

Many work piece shaping processes require a plurality of machines arranged at sequential work stations along a machine line. In these instances, after shaping at one station, a work piece is conveyed to a subsequent station for further shaping, each station generating swarf during the process.

To remove swarf from machine stations, often a conveyor belt is positioned below or adjacent a machine line to automatically catch flushed swarf and convey the swarf to a collection bin at the end of the belt. When the bin is full it is emptied or replaced with another bin. To facilitate use of large collection bins and thereby increase the time between emptying or replacement, most conveyors include a section which conveys upwardly at an inclined angle (e.g. 45 degrees) so that a belt end can be located above an elevated bin wall. To maintain swarf on the belt during inclined conveying (i.e. impede swarf from falling off lateral edges of the conveyor), a conveyor housing including a roof section is typically provided along the inclined section. Conveyor belts are particularly useful where the number of work stations and associated metal removing machines is large.

To cool work pieces and machine cutting tools and to flush swarf away from cutting bits during machining, a liquid coolant is typically dispersed at or near the cutting bits. In addition, swarf inside the bin or on the belt may be cooled by direct coolant dispersion thereon.

Swarf conveyor belts are typically driven by a motor capable of driving the belt in at least a forward direction. During machining, the belt is continuously driven to convey swarf from work stations.

Unfortunately swarf removing systems of the above kind can become obstructed by swarf during operation in at least two different ways. First, swarf can cause conveyor clogging. Only a certain swarf volume can pass though a conveyor housing at any time. Where swarf accumulates adjacent or within a housing, eventually, the accumulation can clog between the belt and housing impeding belt movement.

Second, swarf can become entangled between a belt and a stationary conveyor component (e.g. the housing) acting as a harness impeding belt movement. In this case, an elongated piece of swarf, typically a long corkscrew shaped shaving, can become ensnared at opposite ends between the belt and another component restricting belt movement.

In addition to damaging belt and other conveyor components, clogging and other forms of belt restriction caused by swarf (and or parts, bar ends, tools, etc.) increase motor load and, at some point, can damage motor components if the load becomes excessive.

One solution to belt obstructions has been to equip conveyors with manually operable motors capable of both forward and reverse operation. In this case, when swarf conditions cause motor overloading, an operator can stop the belt, reverse the belt, clear the obstruction and again restart the belt. Removing an obstruction is referred to herein as "clearing".

Unfortunately, this solution to the problem has a number of shortcomings. First, this solution requires an operator to assist what is otherwise an automatic system for removing swarf from work stations. While the operator only needs to act after a clog or entanglement is detected, practically the operator must always be present to identify clogs and entanglements.

Second, where the time required to clear a belt is appreciable, an entire machine line may have to be shut down during the clearing process, further increasing costs associated with the system.

Third, if the obstruction is not noticed immediately, clogged swarf may cause belt, housing and/or motor damage prior to an operator stopping the belt.

Fourth, if the obstruction is not noticed immediately, swarf may accumulate upstream of the clog and fall from the belt. In addition, excessive cooling agent may be flushed into the belt system generally causing a mess or overflowing onto the floor.

Fifth, where the obstruction occurs inside the housing, it may be difficult for an operator to identify the obstruction until swarf backs up to the mouth of the housing.

Another solution for removing swarf obstructions is to provide an automatic clutch on the motor which allows the shaft which drives the belt to slip when motor load becomes excessive. In this case, instead of damaging motor and conveyor components, a clutch allows the motor to operate with a safe load and the belt stops until an operator can perform a clearing process to remove the obstruction.

While this solution reduces the possibility of motor and conveyor component damage, it to is encumbered with shortcomings. For example, this solution still requires an operator to be present to clear every obstruction that occurs. In addition, when the belt is stopped due to overloading, either the entire machine line must be shut down or swarf will continue to accumulate on the belt. Shutting down the entire line is costly. However, swarf accumulation can eventually exceed belt receiving capacity with excess swarf falling off the belt onto a floor surface. This is especially dangerous when swarf is extremely hot as is often the case with metal shavings or the like.

Moreover, as swarf accumulates on a stationary belt during clearing, the accumulated swarf causes conditions which will likely lead to further obstruction once the belt is again running in the forward direction.

For at least these reasons it can be seen that an automatic obstruction clearing method and apparatus would be advantageous for use with a swarf conveyor belt.

BRIEF SUMMARY OF THE INVENTION

The present invention includes a method to be used with a motor controller to control a conveyor belt to eliminate, or at least substantially reduce the likelihood of, swarf caused obstructions. Generally, the inventive obstruction clearing method is to be used with a controller which both controls a belt driving motor and monitors motor load.

The method includes a clearing process involving the steps of monitoring motor load and comparing the monitored load to a threshold load. The threshold load may be the maximum motor load. Where the monitored load is less than the threshold load there is no obstruction and the belt is continually driven in the forward direction. However, when the monitored load is equal to or exceeds the threshold load, an obstruction is likely. Therefore, when the monitored load is equal to or greater than the threshold load, the clearing process includes the steps of stopping the belt, reversing the belt during a reversal period of predetermined duration, stopping the belt again and once again driving the belt in the forward direction.

If the monitored load is still equal to or greater than the threshold load the obstruction likely persists. Therefore, the clearing method further includes repeating the clearing process until the monitored load is less than the threshold load (i.e. the obstruction has been eliminated).

One object of the invention is to automatically clear swarf obstructions on a conveyor belt. The inventive clearing method is successful in automatically clearing obstructions in most instances.

Another object is to eliminate the need for operator observation and interaction to identify and clear an obstruction. To this end, the controller automatically identifies overloading situations and can then be used to clear an obstruction by repeated forward and reverse belt movements to jostle and shake the obstruction free.

Preferably, there is a predetermined number of clearing processes wherein the predetermined number is chosen to likely clear an obstruction. The predetermined number is typically on the order of 5 to 10. In this case, the clearing method further includes the steps of, counting the number of clearing processes performed and comparing the number performed to the predetermined number. When the number performed equals the predetermined number, the controller stops the motor and belt.

Thus, another object of the invention is to stop the belt when it is likely that another clearing process will not clear an obstruction. Here, an operator would have to manually clear the obstruction. This ensures that an endless loop of stopping and starting the motor does not continue.

Preferably the system includes an alarm. Where an alarm is included, the method further includes the step of, after an obstruction has been identified and during the clearing process, signaling via the alarm that an obstruction has occurred. In the alternative or in addition, the method may include an alarm indicating when an obstruction persists after the predetermined number of clearing processes have been performed.

Thus, another object is to provide a method whereby obstructions can be detected even when an obstruction occurs along a section of the belt which is not easily observable (e.g. is in the belt housing) by an operator. One other object is to alert an operator only when manual clearing is required or when an automatic clearing process is being performed.

The method can also be used to eliminate swarf conditions which will likely lead to an obstruction prior to the obstruction occurring. To this end, the threshold load which is typically correlated with the maximum motor load can be decreased so that it corresponds to a fraction of the maximum load. For example, where the maximum load is 10× and a motor driving an unobstructed belt typically represents a 3× load, the threshold load might be set to half the maximum load, in this example, 5×, so that the clearing method is performed prior to the occurrence of a particularly serious obstruction.

Yet one other object is to anticipate when a serious obstruction will occur and eliminate conditions which will likely lead to a serious obstruction. This is accomplished by setting the threshold load at a fraction of the maximum load so that the clearing method is performed prior to a serious obstruction occurring.

The invention also includes an apparatus for implementing the inventive method. In this regard, the inventive apparatus includes a controller for controlling an inverter which in turn controls a belt driving motor. The controller provides commands to the inverter to drive the motor in either forward or reverse directions at various speeds and also instructs the inverter when to stop the motor. The inverter provides exciting voltages to the motor to carry out controller commands. Current drawn by the motor from the inverter is a function of motor load such that motor drawn current increases as motor load increases. Thus, generally, unique motor drawn current levels are associated with unique motor load levels. For example, the maximum load corresponds to a maximum motor current and any chosen threshold load corresponds to a specific threshold current level. Inverters typically monitor motor drawn current.

Thus, where an inverter is used to drive a motor, the monitored current can be used to identify when a motor load exceeds a threshold load level. For example, in the case described above, the maximum load 10× may correspond to 10 Amperes of motor drawn current, the typical load of 3× may correspond to 3 Amperes and the threshold load of 5× may correspond to 5 Amperes. Here, when the monitored current is equal to or exceeds 5 Amperes, the controller can issue a series of commands to the inverter causing the inverter to initiate a clearing process.

Another object is to essentially clear swarf obstructions using simple inexpensive off the shelf components. Controllers, inverters and motors controlled by inverters are standard components which are easily configured to provide the functionality required to implement the inventive method.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention.

BRIEF DESCRIPTION OF THE SEVERAL VIEWS OF THE DRAWINGS

FIG. 2 is an end elevational view of the conveyor of FIG. 1;

FIG. 3 is a cross-sectional view taken along the line 3—3 of FIG. 1;

FIG. 4 is a cross-sectional view taken along the line 4—4 of FIG. 1;

FIG. 5 is a schematic of the inverter of FIG. 1; and

DETAILED DESCRIPTION OF THE INVENTION

I. Hardware Configuration

Figure 1:
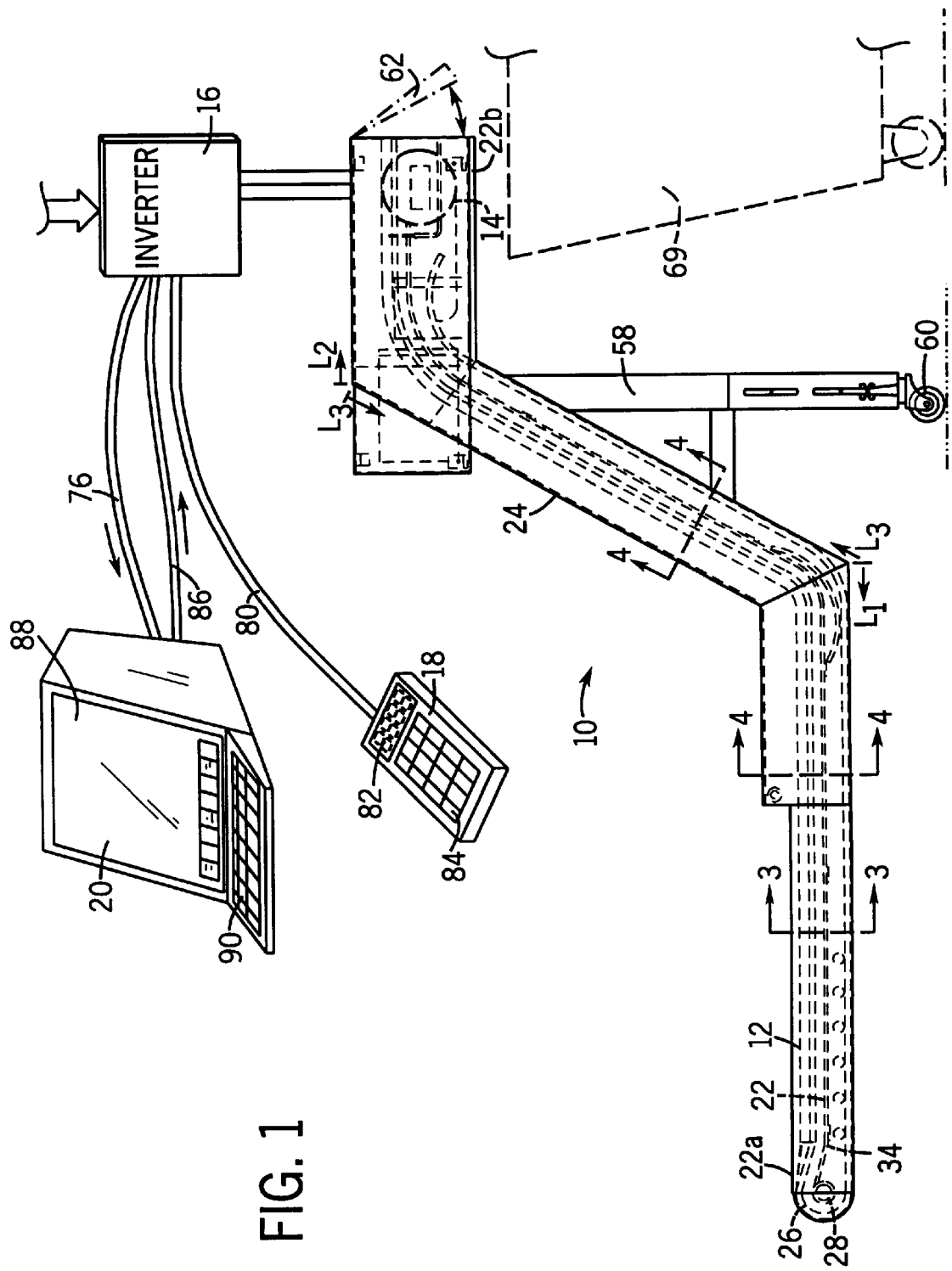
FIG. 1 is a side elevational view of a swarf conveyor belt assembly and a control system according to the present invention.

Referring now to the drawings, where like reference characters represent corresponding elements throughout the several views, and more specifically referring to FIGS. 1 and 2, the present invention will be described in a context of an exemplary swarf conveyor system 10. System 10 generally comprises five components or assemblies including a conveyor 12, a motor 14 for driving the conveyor 12, an inverter 16 for driving motor 14, a parameter programming unit 18 and a computerized numerical controller 20.

Referring to FIG. 4, conveyor 12 includes a belt guiding track 22, a track cover 24 and a conveyor belt 26. Referring specifically to FIG. 1, track 22 defines a course of movement for belt 26. To this end, track 22 includes a first horizontal section $L_1$, a second horizontal section $L_2$ disposed generally above section $L_1$, and an inclined section $L_3$ between horizontal sections $L_1$ and $L_2$.

Referring to FIGS. 1, 3 and 4, track 22 includes several different walls including a bottom horizontal wall 19, a central horizontal wall 34 and two lateral vertical walls 23 and 25. Walls 19, 21, 23 and 25 together define an upper channel 30 and a lower channel 32 below channel 30 along the entire length of track 22.

Two low friction runners 36 and 38 are positioned on a upwardly facing surface 40 of wall 19. Runners 36, 38 are parallel, separated and extend along the entire length of track 22. Similarly, a pair of low friction runners 42, 44 are secured to an upwardly facing surface 46 of wall 34 in channel 30. Runners 42 and 44 are also parallel, separated and extend along the entire length of track 22.

Swarf guidance extensions 48 and 50 extend inwardly from facing surfaces of walls 23 and 25 above runners 42 and 44. An upper surface 52, 54 of each extension 48, 50 respectively, slopes downwardly as it extends inwardly. Surfaces 52 and 54 help guide swarf onto belt 26 within channel 30.

Referring to FIGS. 1 and 2, track 22 is supported by a leg 58 connected to section $L_3$. Leg 58 includes two wheels collectively referred to by the numeral 60 which facilitate conveyor 12 movement. A rotating pulley-type hub 28 is located at a first end 22a and a laterally extending motor housing (see FIG. 2) 56 is located at a second end 22b of track 22.

Track cover 24 (see FIGS. 1 and 4) is provided above channel 30 along sections $L_2$ and $L_3$ and along a section of $L_1$ adjacent $L_3$. A door 62 is hinged to cover 24 at track end 22b which covers end 22b when closed but is openable by swarf exiting the track. A swarf collection bin 69 is illustrated in phantom.

Belt 26 can be of any design known in the art and therefore will not be explained here in detail. Suffice it to say that belt 26 is continuous and passes from channel 30 into channel 32 around a motor shaft at end 22b and passes back from channel 32 into channel 30 around hub 28 at end 22a. Belt 26 is sized so that it rests on, and is supported by, runners 36, 38, 42 and 44.

Motor 14 is a typical three-phase squirrel cage induction motor, the characteristics of which should be understood by those of ordinary skill in the art and therefore will not be explained here in detail. However, it should be understood that motor 14 receives three-phase alternating voltage from inverter 16 which causes the motor to rotate in either a forward or reverse directions at either a high, a medium or low speed, depending on the frequency of the received alternating voltage. Motor 14 is located inside housing 56 and includes a shaft which extends from housing 56 into track 22 at end 22b and is suitably linked to belt 26 to provide a rotating motivating force thereto. Therefore, when motor 14 operates in either the forward or reverse directions, the motor shaft causes belt 26 to move accordingly, conveying belt 26 in either forward or reverse directions.

Referring now to FIG. 5, inverter 16 receives three-phase AC line voltage from a utility on lines 64, 66 and 68 at a utility frequency (e.g. 60 Hz) and modifies that frequency to provide three-phase alternating voltage at a controlled frequency on output lines 70, 72 and 74. Lines 70, 72 and 74 supply motor 14. Inverter also includes a brake output line 78 connected to motor 14 for stopping the motor 14 when required. A preferred inverter is the Mitsubishi Freqrol-A024 or the Freqrol-A044. Inverter 16 includes several input leads including forward start STF, reverse start STR, high speed HS, medium speed MS, stop select SS, and alarm reset RES leads. When a command signal to any of the leads (STF, STR, HS, MS, SS or RESP) is high, inverter 16 operates accordingly. For example, when a command signal to forward start lead STF is high, inverter 16 provides AC voltages on lines 70, 72 and 74 driving motor 14 in the forward direction. Similarly when a command signal to reverse start lead STR is high, inverter 16 drives motor 14 in the reverse direction. When the signal at STF is high and neither the signal at high speed lead HS nor at medium speed lead MS is high, inverter 16 drives motor 14 at a low speed. However, when either of the signals at HS or MS is high, inverter 16 drives motor 14 at the high or medium speeds, respectively. When the signal at stop select lead SS is high, inverter 16 uses line 78 to immediately stop motor 14.

In addition to the three-phase voltages on line 70, 72 and 74 and the brake output 78, inverter 16 also includes at least one other output, a high load output on line 76. As inverter 16 provides voltages on lines 70, 72 and 74, inverter 16 monitors the current drawn by motor 14 on one of the three lines 70, 72 or 74. For the purposes of this explanation it will be assumed that inverter 16 at least monitors a drawn current $I_f$ on line 70. When the monitored current $I_f$ exceeds a threshold current level $I_{th}$, a signal is provided on line 76 indicating that a high load has occurred. As well known in the motor controls art, current drawn by an induction motor increases as load on the motor increases. Therefore, when the load on motor 14 reaches a level which draws a current equal to the threshold current level $I_{th}$, a signal is provided on line 76.

In addition, inverter 16 can be provided with an alarm output 77 to indicate when monitored current If exceeds threshold current $i_{th}$.

Referring to FIGS. 1 and 5, parameter programming unit 18 is connected to inverter 16 via a first bus 80. Unit 18 includes a digital readout 82 and a key pad 84 which allow a user to program various inverter parameters via bus 80. To this end, unit 18 can be used to set the threshold current level $I_{th}$ which is required prior to inverter 16 generating a signal on line 76. In addition, unit 18 can be used to set a number of other parameters including high speed, medium speed and low speed frequencies, and can be used to manually run motor 14 in reverse, forward and at various speeds via inverter 16.

Referring to FIG. 1 controller 20 includes a touch screen 88 and an abbreviated key pad 90 which allow an operator to control inverter 16 and monitor motor 14 operation. In addition, controller 20 includes a microprocessor (not shown) which controls inverter 16 during motor operation as a function of the output on line 76. To this end, line 76 is received by controller 20 and a second bus 86 provides control signals from controller 20 to inverter leads STF, STR, HS, MS, SS and RESP. Thus, controller 20 can drive motor 14 via inverter 16 in the forward direction or the reverse direction at various speeds, can stop motor 14 and can reset an inverter alarm via the inputs.

Controller 20 can also be used to alter operating parameters such as the duration $T_{ro}$ of the reverse rotation periods during a clearing process and the maximum number $X_m$ of clearing processes in a clearing method.

II. Control Method

Generally speaking, according to the inventive control method, with motor 14 operating in a forward direction so that conveyor 12 is moving forward, load on motor 14 will remain relatively constant and within an acceptable range during normal operation. However, when swarf obstructs belt 26 movement, motor load increases substantially. When load increases, the current drawn by motor 14 from inverter 16 also increases substantially. At some point, if the obstruction causes excessive loading, the drawn current exceeds the threshold current. Inverter 16 detects excessive load by comparing the monitored current $I_f$ drawing by motor 14 to the threshold current $I_{th}$. When current $I_{th}$ is exceeded the maximum load is exceeded. At that point, inverter 16 generates a signal on line 76 which is provided to controller 20. Then, to clear the obstruction, controller 20 sends a series of command signals via bus 86 to inverter 16 to stop motor 14, reverse motor 14 for the predetermined reversal time period $T_{ro}$, stop motor 14 and restart motor 14 in the forward direction. This sequence of stopping, reversing, stopping and restarting in the forward direction will typically be sufficient to jostle an obstruction free.

If the obstruction persists, monitored motor drawn current $I_f$ will again quickly exceed the threshold current $I_{th}$ and the excessive load will again be identified. Once again, inverter 16 provides a signal via line 76 to controller 20 which in turn cycles through the clearing process. After a predetermined number $X_m$ of times through the clearing process, if the obstruction persists, controller 20 causes inverter 16 to stop motor 14 and sound an alarm via output 77, either audio or visual or both, altering an operator that belt 26 has been halted.

Figure 6:
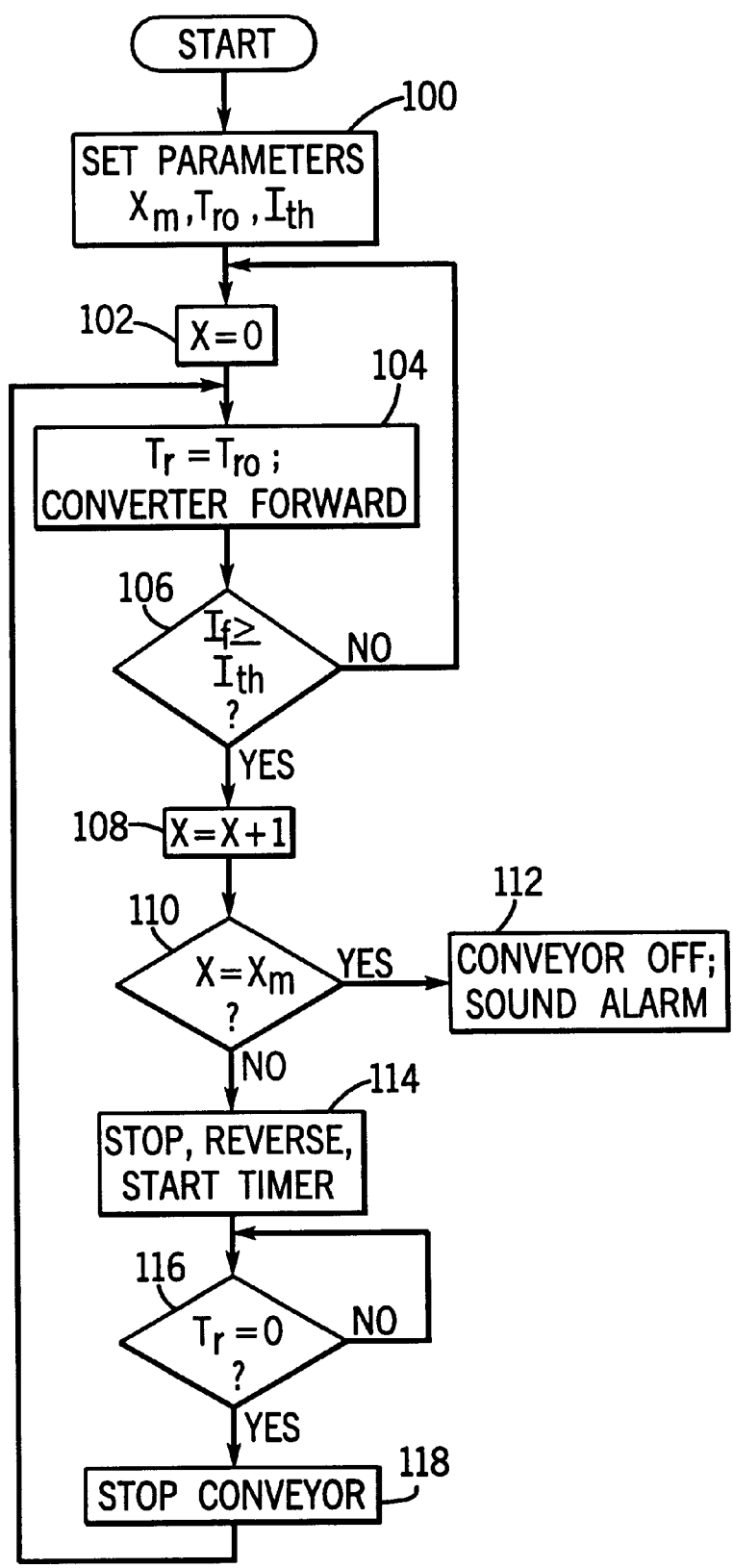
FIG. 6 is a flow chart illustrating an inventive method used by a controller to control the conveyor of FIG. 1.

Referring now to FIGS. 1, 5 and 6, prior to conveyor 12 operation, controller 20 and unit 18 are used to set various operating parameters. Specifically, unit 18 is used to set the threshold current $I_{th}$ parameter while controller 20 is used to set the predetermined number $X_m$ of clearing processes which should be performed prior to stopping conveyor 12 and is used to set reverse time period $T_{ro}$. These parameters are set at process block 100. Next, at block 102 controller 20 initializes a process number variable X and sets variable X equal to 0. Continuing, at process block 104 a counter $T_r$ is set equal to period $T_{ro}$ and controller 20 provides a high command signal to the forward start lead STF of inverter 16. When the STF command is received, inverter 16 provides output voltages on line 70, 72 and 74 driving motor 14 and belt 26 in the forward direction.

At decision block 106 inverter 16 determines whether or not monitored current $I_f$ is equal to or exceeds the threshold current $I_{th}$. To this end, inverter 16 monitors current $I_f$ through line 70 and compares that current $I_f$ to the threshold current $I_{th}$. If monitored current $I_f$ is less than threshold current $I_{th}$, the motor load is less than the maximum load and controller 20 control passes back up to process block 102. However, when monitored current $I_f$ is greater than or equal to threshold current $I_{th}$, control passes to process block 108 where variable X (i.e. number of clearing processes performed) is incremented by 1. Control then passes to decision block 110 where controller 20 determines whether or not variable X is equal to maximum number of clearing processes $X_m$. Where variable X is equal to maximum number $X_m$, the clearing process including stopping, reversing, stopping and restarting the belt in the forward direction has been completed $X_m$ times without successfully clearing the obstruction which is causing the excessive load. In this case, the clearing process will not likely be able to clear the obstruction and therefore, control passes to process block 112 where controller 20 sends a control signal via bus 86 to the stop select lead SS of inverter 16. When inverter 16 receives the SS signal, inverter 16 stops motor 14 via brake output 78 thus causing conveyor belt 26 to stop. In addition, at block 112, inverter 16 generates an alarm signal via output line 77 indicating that belt 26 has been halted.

Referring still to FIGS. 1, 5 and 6, at decision block 110, when variable X is less than maximum number $X_m$, control passes to block 114 where the clearing process begins. To this end, at block 114, controller 20 first provides a high control signal at lead SS causing inverter 16 to stop motor 14 and belt 26. Then, controller 20 provides a high signal at reverse start lead STR which in turn causes motor 14 and belt 26 to move in the reverse direction. In addition, at block 114 controller 20 starts a timer which tracks the amount of time motor 14 is operating in the reverse direction. The timer counts down counter $T_r$ to zero. At decision block 116 controller 20 determines whether or not counter $T_r$ is equal to zero. Where counter $T_r$ is not equal to zero, control loops back to decision block 116. When counter $T_r$ is equal to zero, control passes to block 118 where controller 20 again sends a high signal to inverter lead SS causing inverter 16 to stop motor 14 and belt 26. Next, control again passes up to process block 104 where controller 20 resets counter $T_r$ to period $T_{ro}$ and again provides a forward rotation start input signal STF to inverter 16. Again, when signal STF is received, inverter 16 drives motor 14 in the forward direction causing belt 26 to move forward. At block 106, if the motor load is less than the maximum load, the monitored current $I_f$ will be less than the threshold current level $I_{th}$ and control will again pass up block 102.

Thus, a simple, inexpensive and reliable method and apparatus for implementing the method for automatically clearing swarf obstructions on a conveyor belt have been described.

It should be understood that the methods and apparatuses described above are only exemplary and do not limit the scope of the invention, and that various modifications could be made by those skilled in the art that would fall under the scope of the invention. For example, while the method is described in the context of an inverter and an inverter controlled motor, clearly the inventive method could be implemented using some other motor drive type wherein motor load could be determined by some other means. For example, a clutch type motor could be used wherein, when the clutch disconnects the motor from a driving shaft due to excessive motor load, a sensor could detect the disconnection and start the clearing process above. In addition, while the conveyor described above includes a single motor, clearly the inventive method applies to other systems which require two or more conveyors. Moreover, while the invention is described above as one for use with a swarf conveyor, the invention is meant to cover all types of conveyors such as parts or material conveyors, conveyors including a belt and other types of non-belt conveyors which may become jammed. Furthermore, the invention is also meant to include control wherein various operating parameters could be modified. For example, when the belt is reversed, different speeds and durations might be specified and/or the system might be equipped to identify obstruction during a cleaning process (i.e. during belt/conveyor reversal).

To apprise the public of the scope of this invention, we make the following claims:

1. A method for use with a motor controller for controlling a motor and an associated conveyor belt to essentially eliminate obstructions on the belt, the controller driving the motor and monitoring motor load, the method comprising the steps of:

(a) monitoring motor load;

(b) comparing the monitored motor load to a threshold load;

(c) where the monitored motor load is equal to or exceeds the threshold load, driving the belt according to a clearing process calculated to clear swarf;

(d) wherein the controller is programmed with a predetermined number which is the number of clearing processes which is likely to clear an obstruction, the method further including the steps of repeating steps (a)–(c), counting the number of clearing processes performed, comparing the number performed to the predetermined number and, when the number performed equals the predetermined number, modifying belt control.

2. The method of claim 1 wherein the step of modifying includes stopping the motor and belt.

3. The method of claim 1 also for use with a controller including an alarm, the method also including the step of, after an obstruction has been identified and during the clearing process, signaling via the alarm that an obstruction has occurred.

4. A method for use with a motor controller for controlling a motor and an associated conveyor belt to essentially eliminate obstructions on the belt, the controller driving the motor and monitoring motor load, the method comprising the steps of:

(a) monitoring motor load;

(b) comparing the monitored motor load to a threshold load;

(c) where the monitored motor load is equal to or exceeds the threshold load, driving the belt according to a clearing process calculated to clear swarf;

(d) wherein the controller controls an inverter which in turn controls the belt motor, the inverter providing exciting voltages to the motor to carry out controller commands and the belt linked to the motor as a load, current drawn by the motor from the inverter is a function of motor load such that motor drawn current increases as motor load increases, the step of monitoring including the step of monitoring current drawn by the motor and the step of comparing including the step comparing the monitored current to a threshold current level.

5. An apparatus for essentially eliminating obstructions on a conveyor belt, the apparatus comprising:

(a) a controller which provides command signals indicating how a motor should be controlled;

(b) a driving motor linked to the controller and receiving driving voltages for driving the motor and the belt which is attached thereto;

(c) an inverter which links the controller to the motor, the inverter receiving the command signals and generating the driving voltages as a function thereof, the inverter also monitoring current drawn by the motor, comparing the monitored current to a threshold current level and, when the monitored current exceeds the threshold current level, generating a high load signal which is provided to the controller;

(d) wherein, when the controller receives a high load signal, the controller modifies command signals to drive the belt according to a clearing process calculated to clear obstructions.

6. The apparatus of claim 5 wherein, when the controller receives a high load signal, the controller modifies by stopping the motor, reversing the motor during a reversal period of predetermined duration, stopping the motor and driving the motor in the forward direction.

7. The apparatus of claim 6 wherein, after the clearing process, if another high load signal is received by the controller, the controller steps through the clearing process again.

8. The apparatus of claim 7 wherein, each time the controller performs the clearing process, the controller increments a process number variable and, once the process number variable is equal to a maximum number, the controller causes the inverter to stop the motor.

9. The apparatus of claim 5 wherein the threshold current level is a fraction of a maximum motor current level.

* * * * *